(12) United States Patent
Blanchard et al.

(10) Patent No.: US 9,168,997 B2
(45) Date of Patent: Oct. 27, 2015

(54) AIRCRAFT CONDUIT HARNESS RETENTION SYSTEM

(71) Applicant: AIRBUS OPERATIONS LIMITED, Bristol (GB)

(72) Inventors: Jack Blanchard, Bristol (GB); David Routledge, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/517,198

(22) Filed: Oct. 17, 2014

(65) Prior Publication Data

US 2015/0060612 A1   Mar. 5, 2015

Related U.S. Application Data

(63) Continuation of application No. 13/159,530, filed on Jun. 14, 2011, now Pat. No. 8,888,053.

(30) Foreign Application Priority Data

Jun. 15, 2010  (GB) .................................. 1009965.3

(51) Int. Cl.
| | |
|---|---|
| F16L 3/00 | (2006.01) |
| B64C 1/40 | (2006.01) |
| F16L 3/22 | (2006.01) |
| H02G 3/32 | (2006.01) |
| F16L 3/123 | (2006.01) |
| F16L 3/127 | (2006.01) |
| F16L 3/13 | (2006.01) |

(Continued)

(52) U.S. Cl.
CPC ................. *B64C 1/406* (2013.01); *F16L 3/123* (2013.01); *F16L 3/127* (2013.01); *F16L 3/13* (2013.01); *F16L 3/221* (2013.01); *F16M 13/02* (2013.01); *H02G 3/32* (2013.01); *F16L 3/227* (2013.01); *F16L 3/237* (2013.01)

(58) Field of Classification Search
CPC .............. F16M 3/00; F16M 3/08; F16L 3/13; F16L 3/123; F16L 3/221; F16L 3/227; F16L 3/237; F16L 3/323; H02G 3/32
USPC ............ 248/68.1, 74.1, 74.3, 63.65, 73, 74.4; 403/174, 194; 411/384; 24/16 PB, 20 R
See application file for complete search history.

(56) References Cited

U.S. PATENT DOCUMENTS 2,331,098 A * 10/1943 White et al. .............. 174/40 CC
2,407,217 A    9/1946 Banneyer
(Continued)

FOREIGN PATENT DOCUMENTS

DE        19820651 A1    11/1999
DE    102008041230 A1 *  2/2010
(Continued)

OTHER PUBLICATIONS

British Search Report for GB 1009965.3 dated Oct. 7, 2010.
(Continued)

*Primary Examiner* — Tan Le
(74) *Attorney, Agent, or Firm* — Hauptman Ham, LLP

(57) ABSTRACT

A conduit harness retention system has a base, a first spacer, a second spacer and a cap which snap-fit together to retain P-clip harnesses in position spaced from an aircraft fuselage.

11 Claims, 3 Drawing Sheets

(51) Int. Cl.
*F16M 13/02* (2006.01)
*F16L 3/237* (2006.01)
*F16L 3/227* (2006.01)

(56) References Cited

U.S. PATENT DOCUMENTS

| | | | |
|---|---|---|---|
| 3,552,696 A | | 1/1971 | Orenick et al. |
| 3,563,131 A | * | 2/1971 | Ridley, Sr. .................... 411/384 |
| 4,145,977 A | * | 3/1979 | Yellin .......................... 108/190 |
| 4,601,447 A | | 7/1986 | McFarland |
| 4,618,114 A | | 10/1986 | McFarland |
| 4,708,306 A | | 11/1987 | Mitomi |
| 4,756,638 A | * | 7/1988 | Neyret ......................... 403/261 |
| 4,962,573 A | * | 10/1990 | Breveglieri .................. 24/581.1 |
| 5,056,953 A | | 10/1991 | Marot et al. |
| 5,271,588 A | | 12/1993 | Doyle |
| 5,564,672 A | | 10/1996 | Matson |
| 5,612,509 A | | 3/1997 | Market |
| 6,443,403 B1 | | 9/2002 | Page et al. |
| 6,663,054 B2 | | 12/2003 | Robicheau et al. |
| 7,478,783 B2 | | 1/2009 | Royer |
| 8,888,053 B2 | * | 11/2014 | Blanchard et al. ........... 248/68.1 |
| 2005/0121560 A1 | | 6/2005 | Slyter |
| 2007/0164174 A1 | * | 7/2007 | Hung et al. ................... 248/159 |
| 2011/0303799 A1 | | 12/2011 | Blanchard et al. |
| 2012/0112016 A1 | | 5/2012 | Blanchard et al. |

FOREIGN PATENT DOCUMENTS

| | | |
|---|---|---|
| EP | 1 503 091 A2 | 2/2005 |
| GB | 875935 A | 8/1961 |
| WO | 02/095956 A2 | 11/2002 |
| WO | 03/041541 A2 | 5/2003 |

OTHER PUBLICATIONS

European Search Report for EP Application No. 11169663, dated Mar. 20, 2014.

* cited by examiner

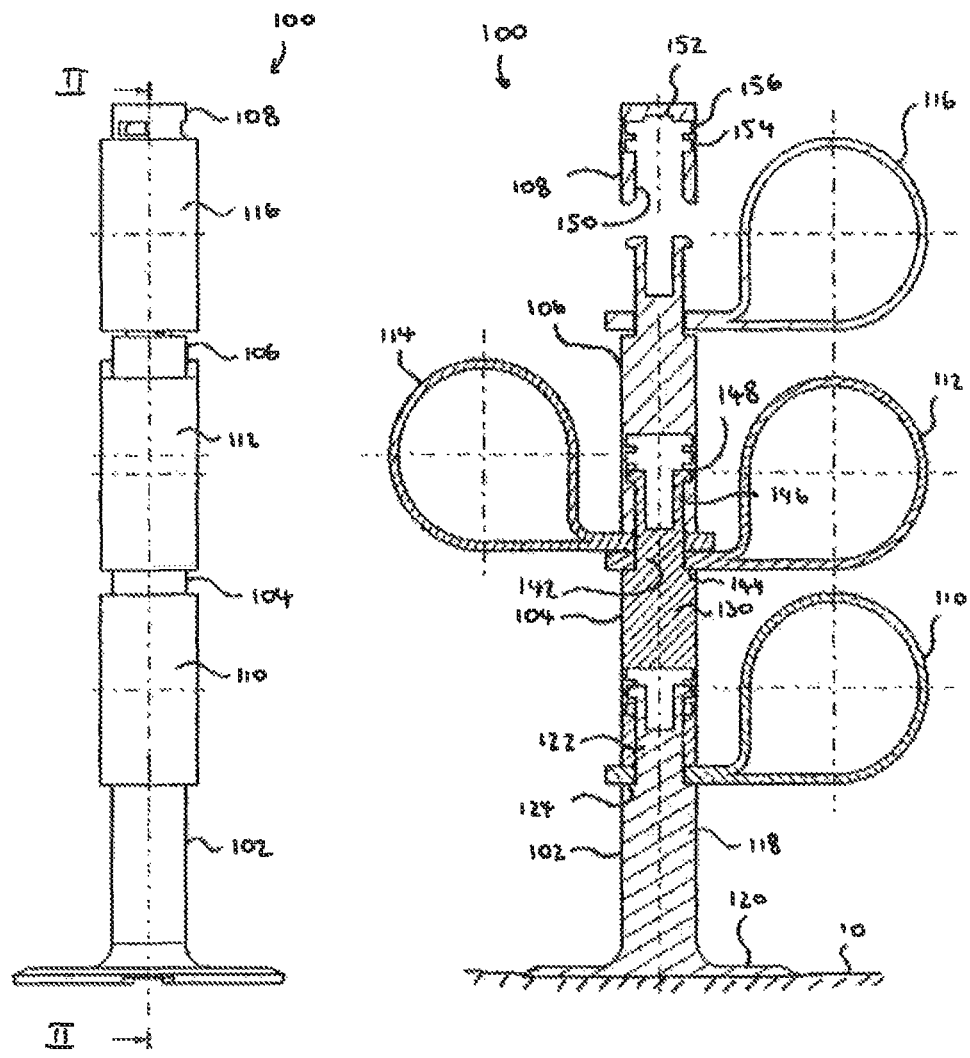
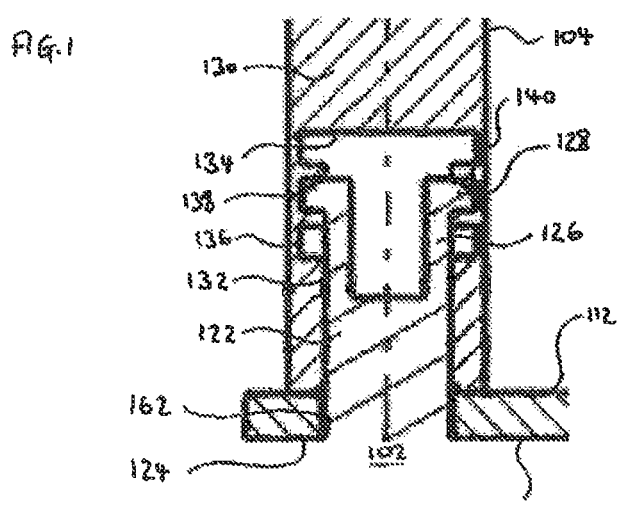

AIRCRAFT CONDUIT HARNESS RETENTION SYSTEM

RELATED APPLICATIONS

The present application is a continuation of U.S. application Ser. No. 13/159,530, filed Jun. 14, 2011, which is based on, and claims priority from, British Application Number 1009965.3, filed Jun. 15, 2010, the disclosures of which are hereby incorporated by reference herein in their entirety.

The present invention relates to an aircraft conduit harness retention system. More particularly, the present invention relates to a snap-fit aircraft conduit harness retention system which permits multiple conduit harnesses to be mounted from a single mounting location.

Wire looms in aircraft are commonly harnessed using P-clip harnesses. Such clips are constructed from strips of metal or plastics material formed in a loop to provide a wire loom receiving portion and a connection portion comprising a fiat double-thickness flange. The flange will typically define a bore for the attachment of the P-clip harness to a component within the aircraft.

Because of their shape, it is only possible to anchor a maximum of two P-clips together at a single point, with the flanges overlapping and the loops facing in opposite directions. This is a problem because if more than two wire looms are to be attached to the aircraft, several anchoring points need to be selected which increases both part count and the need to bore into, and hence weaken, aircraft components more frequently.

It is often desirable to attach other types of conduits to aircraft structures such as hydraulic, pneumatic, coolant or fuel lines.

It is an object of the invention to provide an improved aircraft conduit harness retention system.

According to the present invention there is provided an aircraft conduit harness retention system comprising a first part having an attachment portion for attachment to an aircraft component at a first end and a first mating formation at a second end, a second part having a second mating formation, wherein the first mating formation and the second mating formation are engageable via a snap-fit to retain a flange of a first conduit harness therebetween such that the conduit harness is offset from the aircraft component.

According to a second aspect of the invention, there is provided an aircraft conduit harness retention system comprising a first part having an attachment portion for attachment to an aircraft component at a first end and a first mating formation at a second end, wherein the first mating formation is a snap-fit formation for attachment of a conduit harness.

By providing such an arrangement, conduit harnesses such as P-clips can be offset such that more than two can be mounted to a single position on an aircraft component such as a fuselage, wing or empennage.

An example aircraft conduit harness retention system will now be described with reference to the accompanying figures in which:

FIG. 1 is a front view of a conduit harness retention system in accordance with the present invention.

FIG. 2 is a side section view of the conduit harness retention system of FIG. 1 along II-II, FIG. 3 is a close-up view of a part of the conduit harness retention system of FIG. 1.

Figure 4:
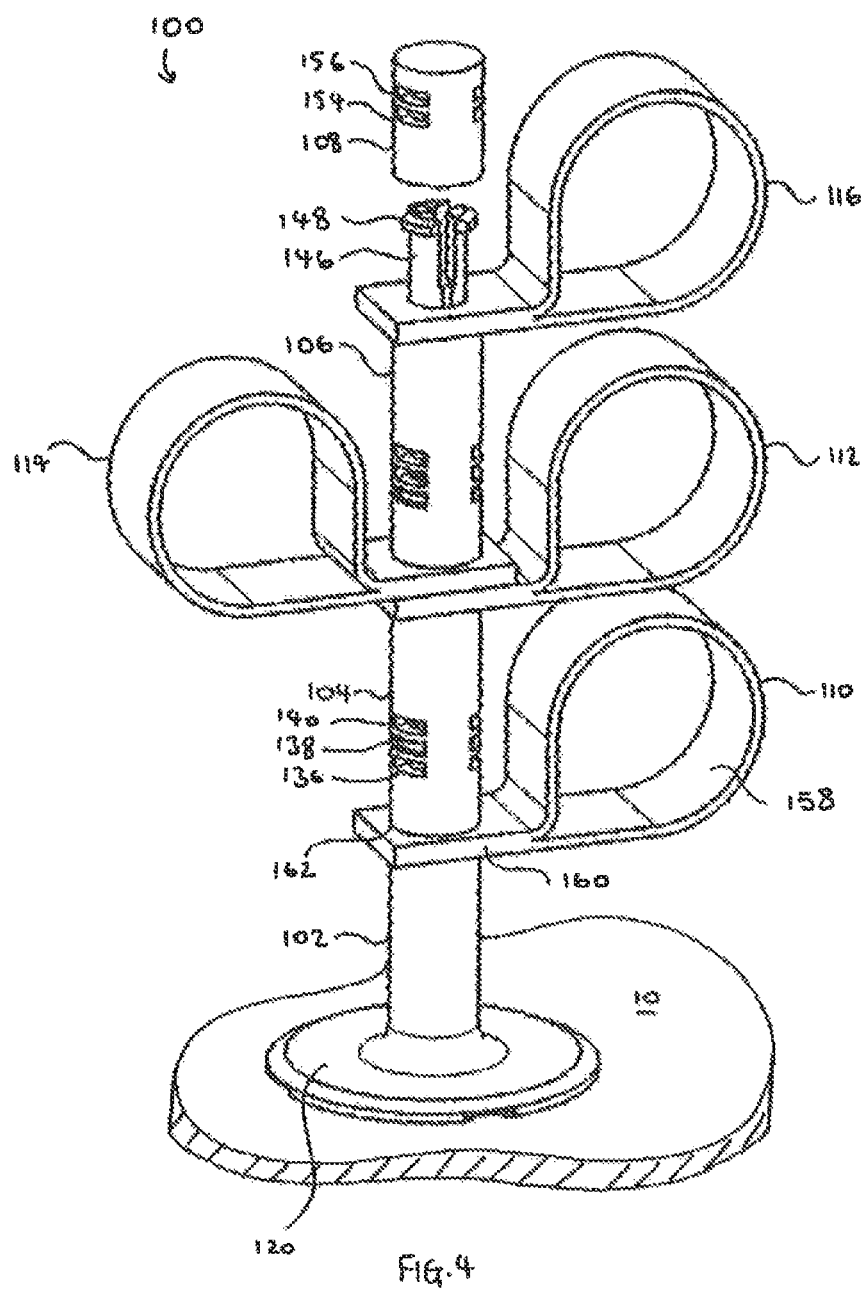
FIG. 4 is a perspective view of the harness retention system of FIG. 1, and, FIG. 5 shows alternative arrangements of the harness retention system of FIG. 1.

A conduit harness retention system 100 is provided which comprises a base 102, a first spacer 104, a second spacer 106 and a cap 108. The harness retention system retains a first P-clip harness 110, a second P-clip harness 112, a third P-clip harness 114 and a fourth P-clip harness 116 as will be described below.

The base 102 comprises a first cylindrical portion 118 which terminates at a first end in a circular flange 120. The flange can be adhered to an aircraft fuselage (or other component) 10. The base 102 comprises a second cylindrical portion 122 at a second end, of a smaller diameter than the first cylindrical portion 118 to form a shoulder 124. The second cylindrical portion 122 terminates in a pair of axially extending flexible fingers 126, each of which comprise a radially outwardly extending tab 128.

The first spacer 104 comprises a first cylindrical portion 130 which, at a first end, defines a blind bore 132 terminating at an end wall 134. The bore extends radially into a first diametrically opposed pair of slots 136, a second diametrically opposed pair of slots 138 and a third diametrically opposed pair of slots 140.

The first spacer 104 is formed substantially identically to the base 102 at a second end, defining a second cylindrical portion 142, a shoulder 144, a pair of axially extending flexible fingers 146 terminating in tabs 148.

The second spacer 106 is substantially identical to the first spacer 104.

The cap 108 is generally cylindrical and comprises a formation similar to the first end of the first spacer 104, having a blind bore 150 terminating in an end wall 152. The bore 152 only has two pairs of diametrically opposed slots 154, 156.

Each P-clip harness 110, 112, 114, 116 comprises a strip of plastics material defining a loop 158 and a flange 160 projecting tangentially therefrom. The flange 160 defines a bore 162 therethrough.

In use, the base 102 is attached to the aircraft fuselage 10 by adhesive. The first P-clip harness 110 is passed over the base 102 such that the bore 162 surrounds the second cylindrical portion 122 and abuts the shoulder 124. The first spacer 104 is then mated with the base 102 such that the fingers 126 enter the blind bore 132. Because of the tabs 128, the fingers deform radially inwardly until the tabs snap into the first slots 136 at which point the fingers 126 resile outwardly. In order to secure the P-clip harness 110 firmly, the first spacer 104 is pushed down further such that the fingers 126 deform inwardly again and the tabs 128 snap into the second slots 138. At this point a groove is formed proximate the shoulder 124 equal in width to the width of the flange 160. The first P-clip 110 harness is therefore secure.

The second and third P-clip harnesses 112, 114 are passed over the second cylindrical portion 142 of the first spacer 104. The P-clip harnesses 112, 114 are diametrically opposed. The second spacer 106 is then placed over the P-clip harnesses 112, 114 to secure them in position. It will be noted that the tabs 148 engage the lower slots of the second spacer 106 only because the combined thickness of the flanges of the second and third P-clip harnesses 112, 114 is higher than a single P-clip harnesses. Therefore a larger groove proximate the shoulder 144 is required.

Finally, the fourth P-clip harness 116 is placed over the upper end of the second spacer 106 and the end cap used to secure it in place.

Figure 5:
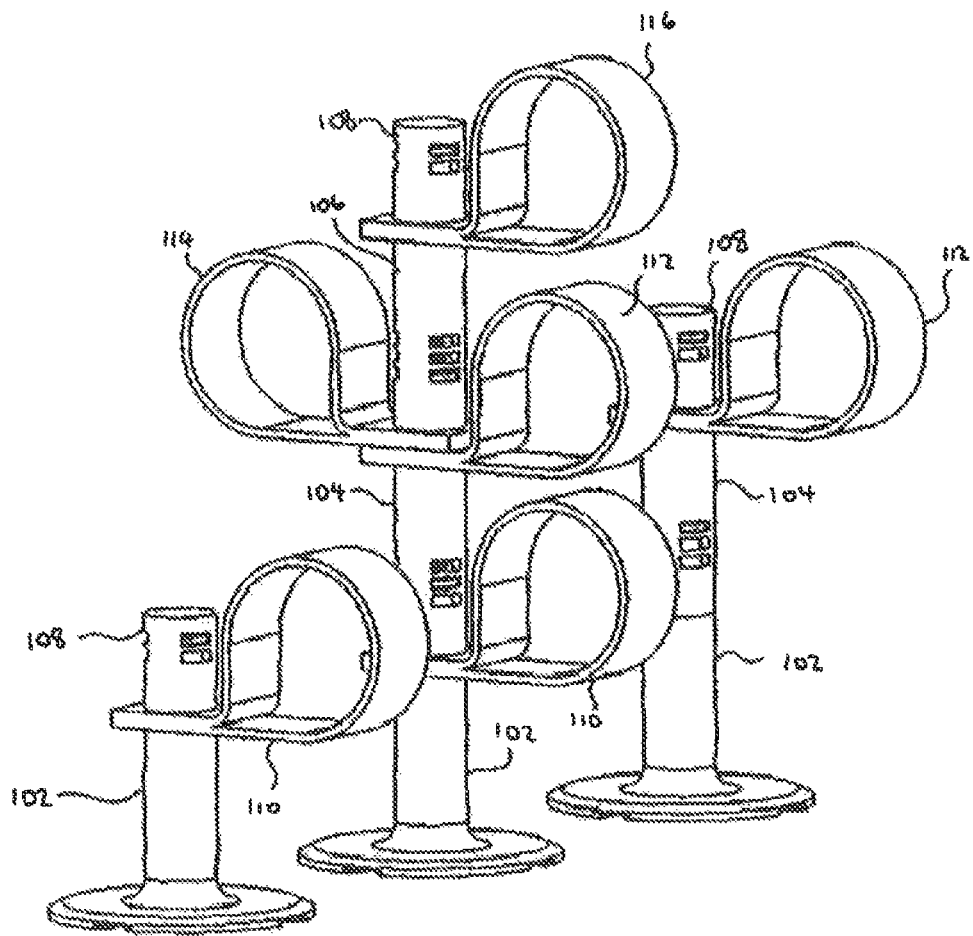

It will be noted that the first and second spacers 104, 106 have three sets of slots. The third slots 140 are used in the event that no P-clip harness will be inserted between the spacer and the base or spacer below, as shown in FIG. 5 in which the second P-clip harness 112 is mounted alone.

Variations of the above embodiment may fall within the scope of the present invention.

For example a further pair of opposing slots may be provided on each spacer as a failsafe position, should the tabs 148 become dislodged from the lowest pair of slots.

Other types of harnesses or clips may be used; the invention is not limited to P-clip harnesses. The system may be used to retain harnesses suitable for other types of conduits; e.g. fuel, pneumatic, hydraulic or coolant.

The snap-fit formations may be designed such that they cannot be disassembled without breaking them. This ensures that the components may only be used once.

The base may be arranged with a snap-fit formation on an upper end thereof to engage the bore of a p-clip without the use of a cap. Such a snap-fit formation preferably comprises radially outwardly biased fingers to hook over the periphery of the p-clip bore.

The invention claimed is:

1. An aircraft conduit harness retention system comprising:
   a base having a flange attachment formation for attachment to an aircraft component at a first end and a first mating formation at a second end;
   a spacer having a second mating formation at a first end and a mating formation identical to the base first mating formation and a second end;
   a cap having a mating formation identical to the spacer first end; and
   a conduit harness separate from the base and the spacer, wherein said conduit harness includes a wire loom receiving portion and a flange connected to the wire loom receiving formation, the flange having a bore defined therethrough,
   wherein the bore of the flange is engaged by at least one of the first mating formation and second mating formation and the first mating formation and the second mating formation are engaged via a snap-fit to clamp the flange of the conduit harness between the base and spacer or cap such that the conduit harness is offset from the aircraft component.

2. An aircraft conduit harness retention system according to claim 1 wherein a second spacer identical to the spacer is provided.

3. An aircraft conduit harness retention system according to claim 2 in which the first mating formation and the second mating formation form a snap-fit connection engageable in a first snap-fit position and a second snap-fit position in the direction of engagement.

4. An aircraft conduit harness retention system according to claim 3 in which in the first snap-fit position first mating formation and the second mating formation are engaged to provide a recess therebetween, and in the second snap-fit position the mating parts abut.

5. An aircraft conduit harness retention system according to claim 1 in which one of the base and spacer parts comprises an elongate portion, and the corresponding mating formation defines a tab configured to resile outwardly to engage a recess on the other mating formation.

6. An aircraft conduit harness retention system according to claim 5 in which the elongate portion comprises a resilient finger extending therefrom, the tab defined at a first end of the finger.

7. An aircraft conduit harness retention system according to claim 5 in which the elongate portion is generally cylindrical, the finger extends axially therefrom, and the tab extends radially therefrom.

8. An aircraft conduit harness retention system according to claim 1, wherein the separate conduit harness is a P-clip harness.

9. An aircraft conduit harness retention system according to claim 1, wherein the first mating formation is positioned spaced apart from the flange attachment formation such that the conduit harness does not contact the aircraft component in use.

10. An aircraft conduit harness retention system comprising:
    a base having a flange attachment formation for attachment to an aircraft component at a first end and a first mating formation at a second end;
    at least one spacer having a second mating formation at a first end and a mating formation identical to the base first mating formation and a second end;
    a cap having a mating formation identical to the spacer first end; and
    at least one conduit harness separate from the base and the spacer, wherein said conduit harness includes a wire loom receiving portion and a flange connected to the wire loom receiving formation, the flange having a bore defined therethrough,
    wherein the bore of the flange is engaged by at least one of the first mating formation and second mating formation and the first mating formation and the second mating formation are engaged via a snap-fit to clamp the flange of the conduit harness between the base and spacer or cap such that the conduit harness is offset from the aircraft component.

11. An aircraft conduit harness retention system according to claim 10, wherein said at least one spacer is a plurality of spacers and said at least one conduit harness is a plurality of conduit harnesses.

* * * * *